Patented June 5, 1923.

1,457,320

UNITED STATES PATENT OFFICE.

BERT A. STAGNER, OF PITTSBURGH, PENNSYLVANIA, ASSIGNOR TO NATIONAL RETARDER COMPANY, OF CHICAGO, ILLINOIS, A CORPORATION OF OHIO.

GROWING OF YEAST.

No Drawing.   Application filed July 25, 1919.   Serial No. 313,333.

*To all whom it may concern:*

Be it known that I, BERT A. STAGNER, a citizen of the United States, residing at Pittsburgh, in the county of Allegheny, State of Pennsylvania, have invented certain new and useful Improvements in the Growing of Yeast; and I do hereby declare the following to be a full, clear, and exact description of the invention, such as will enable others skilled in the art to which it appertains to make and use the same.

This invention relates to improvements in the growing of bakers' yeast of good color, odor and keeping qualities and having good baking strength when used in the manufacture of leavened bread.

In the growing or propagation of baker's yeast a considerable amount of nitrogenous food material is essential. It is, moreover, important to insure that the nitrogenous food material supplied is of suitable character and quality, so that the formation of objectionable by-products, such as would impart to the yeast, and to the bread made therewith, an objectionable odor or flavor, or a dark color, or such as would weaken the baking strength of the yeast, is avoided. Inasmuch as yeast is itself a vegetable growth, it has been the common and almost universal practice in the art to employ malt sprouts as the nitrogenous food material in the growing of bakers' yeast, the yeast being thereby supplied with nitrogenous food material of vegetable origin.

I have discovered that yeast of good color, odor and keeping qualities, and having good baking strength when used in the manufacture of leavened bread, can be successfully and advantageously grown with the aid of nitrogenous food material of animal origin derived from elastin or elastin-containing substances by hydrolysis, for example, connective tissue such as ligaments. Elastin itself, or ligaments containing it, are not suitable for use as yeast-food; but I have found that if subjected to hydrolysis, the resulting products of hydrolysis provide a valuable nitrogenous food for use in the growing and propagation of bakers' yeast.

After extensive investigations I have found that in order to produce a proper yeast food that the degree of hydrolysis is most important. A mere solution of the elastin material is not sufficient because the protein molecule is still too complex for assimilation by the yeast cells. On the other hand I have found that if the hydrolysis is carried too far and the elastin material broken down to the ultimate amino acids that a very poor yeast food is produced. The best yeast food is produced by carrying the hydrolysis to an intermediate degree in which some of the nitrogen occurs in the amino acids and some in the less complex proteoses. After trying various hydrolyzing agents, both acid and alkaline, I have found that the only really satisfactory hydrolyzing agent is lime. Acid hydrolysis gave a poor yeast food that was of disagreeable odor and was difficult to filter. I have found that a very satisfactory yeast food is produced from elastin containing materials by hydrolyzing ligaments, such as ligamentum nuchæ, with lime under the conditions set forth in the specific examples below.

The present invention accordingly involves an improved method of growing bakers' yeast, according to which there is associated with the yeast and carbohydrate material commonly employed, products of hydrolysis of elastin or elastin-containing substances, by treatment with lime. As a source of elastin I may use ligaments or tendons, which contain a preponderance of elastin and a little collagen. For instance, ligamentum nuchæ consists of about 75% elastin and about 17% collagen. The presence of the collagen is in no way detrimental to the operation, because it itself is a protein which is hydrolized more or less also and contributes to the formation of the yeast food. I find it is not at all necessary to effect a separation between the elastin and the collagen. In my companion application Serial No. 313,332, I have set forth a specific method of preparing a nitrogenous yeast food by treating materials containing a preponderance of collagen.

For example, ligaments, such as the ligamentum nuchæ, are subjected to hydrolysis by heating about 400 parts of ligaments (on a dry basis), together with about 40 parts of lime and 1600 parts of water in an autoclave at a temperature of about 160° to 180° C., for a period of time of about three to ten hours. The temperature and the time should be so regulated that the hydrolysis is carried to a degree sufficient to break down the elastin to the less complex proteoses but without carrying it to the stage such that most of the protein is broken down to the various amino acids. The resulting solution is then filtered and preferably neutralized, e. g., with sulfuric acid, and with removal of the calcium sulfate by filtration and it is then available for use, or it can be concentrated to give a more concentrated solution, or to give a solid product which can be powdered and used in a pulverized state.

The dried products produced as above described, as well as the solutions thereof, have a high nitrogen content, and are in a form readily available to the growing yeast. In the practice of the invention, such hydrolized products are associated with the carbohydrates or carbohydrate substances, and with the yeast, and the growth of the yeast is then permitted to take place under conditions similar to those commonly employed when malt sprouts are used as the nitrogenous nutrient.

If sufficient nitrogenous food material is not present, the growth of the yeast is retarded, and the yeast tends to autolize itself and to ferment the carbohydrates, with the resulting production of alcohol and carbon dioxide, rather than itself increase in weight of yeast. It is accordingly important to provide sufficient nitrogenous food material so that the desired increase in yeast will take place. The hydrolized elastin, although of high nitrogen content, can, nevertheless, be used in sufficiently large amounts to insure rapid yeast growth without objectionable formation of by-product or of objectionable color, taste or odor.

Instead of adding the dried products of hydrolysis to the yeast and other ingredients, the solution resulting from the hydrolysis is neutralized and filtered to remove the insoluble sludge and the precipitated calcium salts. When the dried products of hydrolysis are employed, it is preferable first to dissolve them in water to form a solution. It is of advantage to prepare the products in a dried form, where they are to be shipped or stored.

The following specific example will further illustrate the practice of the invention.

29 parts by weight of hydrolized elastin (from ligaments) are added to a mash made of about 800 parts of grain, such as mixed corn, barley and rye, and five parts by weight of yeast are added to the aqueous extract thereof, and permitted to develop in the usual way. The resulting yeast is of good color, odor and keeping qualities, and is comparable with bakers' yeast obtained when malt sprouts are employed as the source of nitrogenous material. The yeast has good baking strength and is well adapted for use in the manufacture of leavened bread. It can be used directly for bread-making, or it can be converted into the form of compressed yeast or into the form of a dried cake.

In the growing of the yeast, it will, of course, be understood that the products of hydrolysis above referred to are not of themselves sufficient for the growing of yeast without the association therewith of added carbohydrate, inasmuch as the hydrolysis products are essentially nitrogenous in character. Accordingly, as above indicated, a carbohydrate or mixture of carbohydrates should be be associated with the hydrolytic products, for instance, sugar, or the filtered wort obtained from corn, rye, barley or other grains.

The products of hydrolysis of elastin and elastin-containing substances above referred to, have the advantage, due to their nitrogenous character, of permitting a saving in the amount of grain commonly required when malt sprouts are used. They present the further advantage of providing a satisfactory nitrogenous yeast food in a highly concentrated form and free from objectionable ingredients prejudicial to the yeast growth and to the desired properties of bakers' yeast. They, nevertheless, enable a satisfactory and merchantable yeast to be produced, which is well adapted for use, in the form of yeast foam, compressed yeast, etc., for baking purposes in the manufacture of leavened bread.

I do not claim herein the process in which products of hydrolysis of animal proteins are employed in the growing of bakers' yeast, inasmuch as the more comprehensive claims of my companion application, Serial No. 313,332, filed of even date herewith are directed thereto. The claims of the present case are directed to the process in which the products of hydrolysis by treatment with lime of elastin or elastin-containing substances are employed, whereas, the specific claims of said companion application are directed to the process in which products of hydrolysis of collagen or collagen-containing substances are employed.

The yeast food and the method of producing the same described herein, are described in the co-pending application filed December 11, 1922, Ser. No. 606,291.

I claim:

1. The method of growing baker's yeast of good color, odor and keeping qualities, and having good baking strength in the manufacture of leavened bread, comprising growing the said yeast with nutrient mediums containing suitable carbohydrate material and a nitrogenous yeast food made by hydrolyzing elastin containing materials with lime and water at an elevated temperature.

2. The method of growing baker's yeast of good color, odor and keeping qualities, and having good baking strength in the manufacture of leavened bread, comprising growing the said yeast with nutrient mediums containing suitable carbohydrate material and a nitrogenous yeast food made by hydrolyzing material containing a preponderance of elastin with lime and water at an elevated temperature.

3. The method of growing bakers' yeast of good color, odor and keeping qualities, and having good baking strength in the manufacture of leavened bread, comprising growing the said yeast with nutrient mediums containing suitable carbohydrate material with a nitrogenous yeast food made by subjecting 400 parts of material containing a preponderance of elastin to hydrolysis by heating with 40 parts of lime and 1600 parts of water, at a temperature of 160° to 180° C. for a period of from 3 to 10 hours.

In testimony whereof I affix my signature.

BERT A. STAGNER.